United States Patent [19]
DeWitt et al.

[11] 3,965,250
[45] June 22, 1976

[54] SEPARATION OF SULFUR ISOTOPES

[75] Inventors: Robert DeWitt, Centerville; Bernhart E. Jepson, Dayton; Roger A. Schwind, Centerville, all of Ohio

[73] Assignee: The United States of America as represented by the United States Energy Research and Development Administration, Washington, D.C.

[22] Filed: July 3, 1974

[21] Appl. No.: 485,652

Related U.S. Application Data

[62] Division of Ser. No. 322,566, Jan. 10, 1973, Pat. No. 3,869,255.

[52] U.S. Cl. .................................. 423/539; 203/5; 423/659
[51] Int. Cl.² ................... B01D 59/32; C01B 17/48
[58] Field of Search ............ 203/5, 28; 204/98, 104; 423/539, 242

[56] References Cited
UNITED STATES PATENTS

| | | |
|---|---|---|
| 3,050,367 | 8/1962 | Holmberg .............................. 203/5 |
| 3,475,122 | 10/1969 | McRae et al. ....................... 423/539 |
| 3,523,755 | 8/1970 | McRae et al. ....................... 423/539 |
| 3,524,801 | 8/1970 | Parsi .................................. 204/104 |

OTHER PUBLICATIONS

Steward, David W. et. al. The Further Concentration of $S^{34}$ Journal of Chemical Physics vol. 8 Dec., 1940 pp. 904–907.
Wilson et al. Preparation and Measurement of Isotopic Tracers 1947 J. W. Edwards, Ann Arbor, Mich. pp. 1–10.

*Primary Examiner*—Oscar R. Vertiz
*Assistant Examiner*—Gary P. Straub
*Attorney, Agent, or Firm*—Dean E. Carlson; Dudley W. King; Ignacio Resendez

[57] ABSTRACT

Sulfur isotopes are continuously separated and enriched using a closed loop reflux system wherein sulfur dioxide ($SO_2$) is reacted with sodium hydroxide (NaOH) or the like to form sodium hydrogen sulfite ($NaHSO_3$). Heavier sulfur isotopes are preferentially attracted to the $NaHSO_3$, and subsequently reacted with sulfuric acid ($H_2SO_4$) forming sodium hydrogen sulfate ($NaHSO_4$) and $SO_2$ gas which contains increased concentrations of the heavier sulfur isotopes. This heavy isotope enriched $SO_2$ gas is subsequently separated and the $NaHSO_4$ is reacted with NaOH to form sodium sulfate ($Na_2SO_4$) which is subsequently decomposed in an electrodialysis unit to form the NaOH and $H_2SO_4$ components which are used in the aforesaid reactions thereby effecting sulfur isotope separation and enrichment without objectionable loss of feed materials.

5 Claims, 1 Drawing Figure

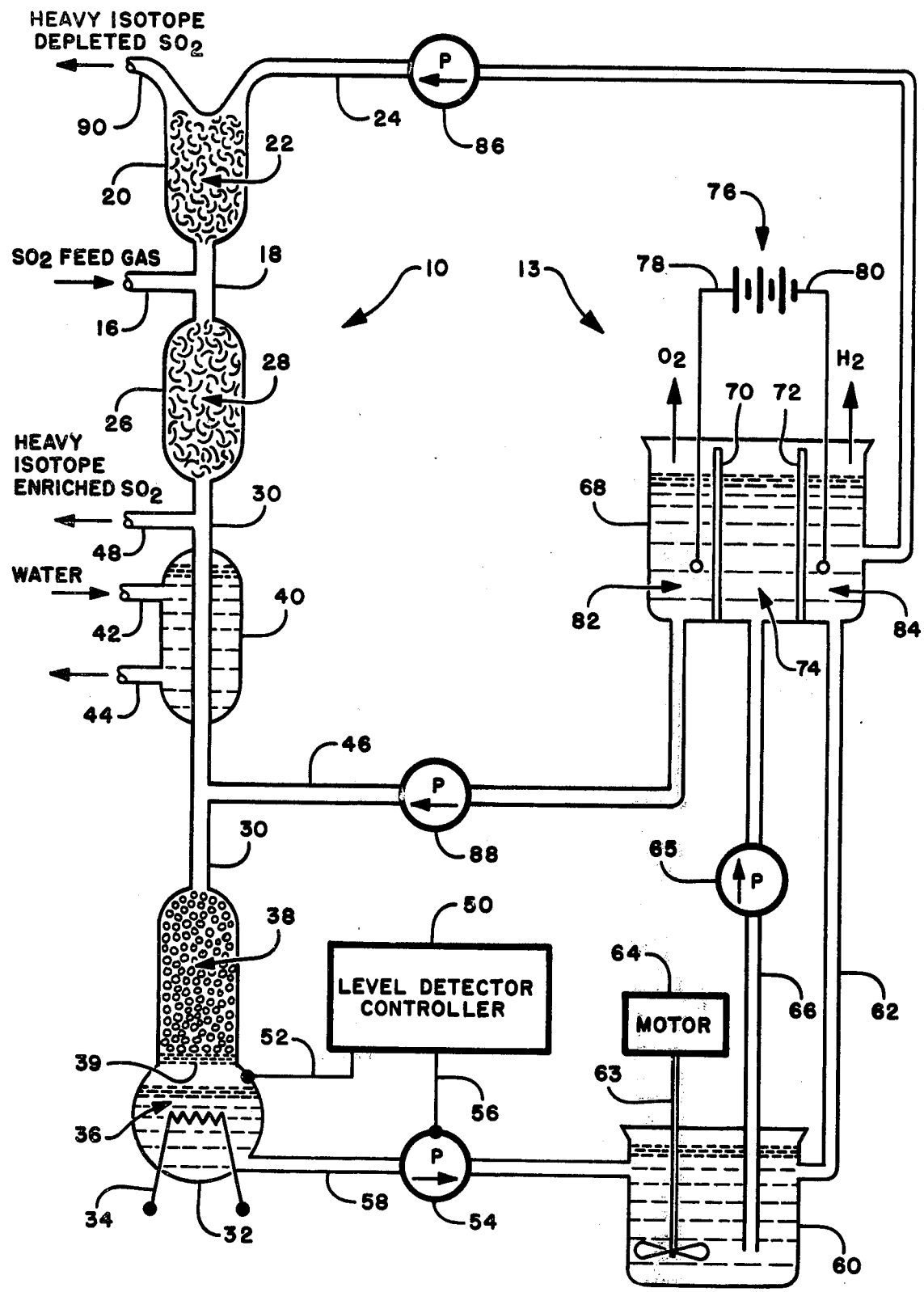

SEPARATION OF SULFUR ISOTOPES

This is a division of Ser. No. 322,566, filed Jan. 10, 1973, now U.S. Pat. No. 3,869,255.

BACKGROUND OF INVENTION

This invention is concerned with continuous isotope separation and enrichment in a closed loop reflux system.

The separation of sulfur-34 ($^{34}$S) from sulfur-32 ($^{32}$S) using the bisulfite chemical exchange system is generally known. An equation representative of this reaction is

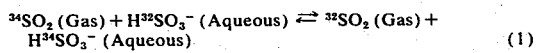

$$^{34}SO_2 \text{ (Gas)} + H^{32}SO_3^- \text{ (Aqueous)} \rightleftarrows {}^{32}SO_2 \text{ (Gas)} + H^{34}SO_3^- \text{ (Aqueous)} \qquad (1)$$

This separation, however, has not been developed into general usage because of the problem in providing closed loop reflux, i.e., the process as known requires the use of large quantities of chemicals in relation to the amounts of separated isotopes produced. The major drawback to such a system, therefore, is the need for large quantities of chemicals and the resultant waste disposal problem or reclamation problem, since open end reflux systems require continuous supply of chemicals and consequently produce a waste chemical stream. Prior art chemical exchange processes for enrichment of sulfur isotopes are open end systems having the above noted problems.

SUMMARY OF INVENTION

In order to overcome the foregoing problems and disadvantages, it is an object of this invention to provide a closed loop reflux system which does not require continuously recharging with large quantities of fresh chemicals for the reaction.

It is a further object of this invention to provide a closed loop reflux system which eliminates or minimizes waste disposal problems of the prior art.

It is a further object of this invention to utilize a novel combination of an electrodialysis system with a chemical exchange system.

It is a further object of this invention to use an electrodialysis system for converting $Na_2SO_4$ into NaOH and $H_2SO_4$ which are subsequently used in the separation and concentration of a sulfur isotope in a bisulfite chemical exchange system.

Various other objects and advantages will appear from the following description of the system and the apparatus used and are particularly pointed out hereinafter in connection with the appended claims. It is understood that persons skilled in the art may make various changes in the design, materials, etc., as described herein within the principles and scope of this invention as brought out in the appended claims.

The invention comprises a continuous closed loop reflux system for separation and enrichment of different isotopes of an element by the use of electrodialysis apparatus together with a chemical exchange system. The invention further comprises the enrichment of isotopes of sulfur wherein $SO_2$ feed gas containing different sulfur isotopes is reacted with NaOH to form $NaHSO_3$ in a chemical exchange column wherein the heavier isotopes of sulfur are preferentially carried with the $NaHSO_3$ and thereafter the $NaHSO_3$ is reacted with $H_2SO_4$ effecting the separation of $SO_2$ enriched in heavier isotope which is removed from the chemical exchange system and wherein the $H_2SO_4$ and NaOH are regenerated and recycled to maintain a closed loop circuit.

DESCRIPTION OF DRAWING

The drawing illustrates a typical reaction column and electrodialysis system for the process of this invention.

DETAILED DESCRIPTION

Apparatus for effecting the present invention may comprise a reaction column 10 and electrodialysis unit 13 as shown in the drawing. The reaction column 10 provides the means for the enrichment of the isotopes while the electrodialysis system 13 regenerates the chemicals required for reaction with the feed gas in reaction column 10 from the reaction products of the reaction column 10.

Although this invention is applicable to many reactions or separations such as the enrichment of nitrogen-15 ($^{15}$N) by exchange between ammonia and aqueous solutions of ammonium sulfate, ammonium nitrate, or ammonium hydroxide, the enrichment of sulfur isotopes will be presented herein. This, however is not intended to restrict the apparatus to the separation of sulfur isotopes.

In separating different sulfur isotopes in accordance with equation 1 as stated hereinabove, $SO_2$ feed gas is reacted with NaOH as follows:

$$SO_2 + NaOH \rightarrow NaHSO_3 \qquad (2)$$

The heavier sulfur isotopes in the $SO_2$ feed gas preferentially go into the $NaHSO_3$ formed in equation 2. Thereafter $NaHSO_3$ is reacted with $H_2SO_4$ and the products of this reaction are $NaHSO_4$, water ($H_2O$) and $SO_2$ as follows:

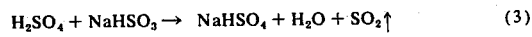

$$H_2SO_4 + NaHSO_3 \rightarrow NaHSO_4 + H_2O + SO_2\uparrow \qquad (3)$$

The $SO_2$ formed in the reaction of equation 3 is more concentrated in the heavier sulfur isotope and may be removed from the exchange column. The $NaHSO_4$ is reacted with NaOH and forms $Na_2SO_4$. The $Na_2SO_4$ is decomposed in an electrodialysis unit to form $H_2SO_4$, which is one of the reactants in equation 3, and NaOH which is the other reactant in equation 2 so that a closed loop reflux system using this reaction may be effected.

In the drawing, $SO_2$ feed gas or other suitable fluid which contains different sulfur isotopes such as sulfur-34 ($^{34}$S) in quantities such as about 4.2% and sulfur-33 ($^{33}$S) at about 0.7% as well as sulfur-36 ($^{36}$S) at about 0.014% may be fed into conduit 16 which joins with or feeds into conduit 18. The $SO_2$ feed gas will then enter into reaction vessel 20 which may have an appropriate filler 22, such as stainless steel wire spirals, disposed therein to increase the surface area of the reactants contacting the $SO_2$ and enhance the reaction. NaOH at a molarity of between about 1 molar and 6 molar and preferably at about 3 molar may be fed in through conduit 24 into reaction vessel 20 so as to thoroughly contact the $SO_2$ feed gas and react therewith in reaction vessel 20 forming $NaHSO_3$ as per equation 2. The $NaHSO_3$ formed may flow downward into a chemical exchange column or second reaction vessel 26 which may also contain disposed therein a filler material 28 similar to and for the same purpose as filler material 22. The $NaHSO_3$ formed in reaction column 20 traverses or passes through reaction vessel 26 into conduit 30 and subsequently into distillation flask or apparatus 32. Second reaction vessel 26 is provided for the purpose of enriching the NaHSO$_3$ with the heavier isotope.

Distillation flask, vessel or apparatus 32 is heated by such as an electrical resistance heater 34 or the like heating means. When the separation and enrichment of the heavier sulfur isotope such as $^{34}$S isotope is commenced, distillation flask 32 may have water removed or may be partially filled with water to adjust to the desired concentrations. However, the solution 36 within distillation flask 32 will become the reaction product of the NaHSO$_3$ with H$_2$SO$_4$ as will be described hereinafter. Also disposed within a portion of distillation flask 32 is an appropriate filler material 38 such as ceramic raschig rings or Berl saddles which have the purpose of increasing the surface area of the reactants therein so as to enhance the reaction. A permeable wall 39 may be positioned between filler material 38 and solution 36 to maintain the filler material separate from the bottom portion of flask 32. Distillation vessel 32 may be heated to a temperature of from about 25°C to about 70°C and is preferably maintained at about 30°C to about 45°C for the separation and enrichment of sulfur isotopes, including $^{34}$S from $^{32}$S. A suitable vapor condenser 40 which may include a water or other fluid cooling jacket may be disposed adjacent or about conduit 30 so as to condense vapors being generated at distillation flask 32. The cooling fluid may be used entering at conduit 42 and exiting at conduit 44.

H$_2$SO$_4$ of molarity of from about 1 molar to about 6 molar, and preferably at a concentration of about 3 molar, may be input into conduit 30 by means of conduit 46. It is desirable to maintain the concentration within the given range in order to optimize enrichment of desired isotopes. H$_2$SO$_4$ reacts with the NaHSO$_3$ product of reaction vessel 20 in flask 32 as per equation 3. SO$_2$ with a higher concentration of $^{34}$S than the feed gas or other heavy isotope desired to be separated, is one of the reaction products and may be removed through conduit 48. This product, low in $^{32}$S concentration, could then be used as feed material in another cascade to enrich $^{34}$S and $^{36}$S if present. Equation 3 reaction takes place within the upper portion of distillation flask 32 and generally around the filler material 38. The H$_2$O and the NaHSO$_4$ which are the other products of equation 3 descend into distillation flask 32. A liquid level within distillation flask 32 is maintained by means of fluid level detector and controller 50 which is appropriately connected to flask 32 and to pump 54 by suitable means such as through electrical connections 52 and 56. Conduit 58 may be used to remove the NaHSO$_4$ and H$_2$O products of equation 3 from distillation flask 32 into a suitable container or mixing vessel 60 using pump 54 which is actuated as required by level detector and controller 50.

The NaHSO$_4$ solution which is the product of equation 3 is removed from distillation flask or vessel 32 and reacted in container 60 with NaOH solution which is fed in by means of conduit 62. Water in distillation flask 32 is also carried over into container 60 in the same manner. Suitable stirring means 63, such as a propeller connected to a suitable power source like motor 64, may be used to thoroughly agitate the slution and insure thorough mixing and consequent reaction of the NaOH and the NaHSO$_4$.
The equation for this reaction is:

$$NaOH + NaHSO_4 \rightarrow Na_2SO_4 + H_2O \qquad (4)$$

The Na$_2$SO$_4$ formed by this equation reaction is appropriately removed from container 60 such as through pump 65 through conduit 66 and transferred to an electrodialysis unit 13. Conduit 66 interconnects or communicates with container 60 and container 68 of electrodialysis unit 13 and, more specifically, with the chamber, cell, or compartment 74 formed by the walls of container 68 and an anion permeable membrane 70 and a cation permeable membrane 72. The compartment 74 contains Na$_2$SO$_4$ and H$_2$O transferred from container 60. A suitable power source, such as battery 76, may be used to create a dissociation current between anode 78 and cathode 80 and through the various solutions in container 68. Anode 78 may be disposed within a chamber, cell or compartment 82 situated adjacent chamber 74 but separated therefrom by anion permeable membrane 70. Cathode 80 may be disposed within chamber, cell or compartment 84 which is situated adjacent chamber 74 but separated therefrom by cation permeable membrane 72. the walls of chamber 68 together with the anion and cation membranes may form compartments or chambers 82 and 84 respectively. Production of a current though the solutions may effect migration of the sodium ion (Na$^+$) (from the Na$_2$SO$_4$ in solution) from chamber 74 to chamber 84 through cation permeable membrane 72 and also effect the migration of the sulfate ion (SO$_4^=$) (from the Na$_2$SO$_4$ in solution) through anion permeable membrane 70 into chamber 82. Water will be decomposed in chamber 84 to form hydrogen gas and OH$^-$ to maintain electrical neutrality with Na$^+$ which was transported into the cell to form the NaOH. Oxygen is released as oxygen gas (O$_2$) in chamber 82 and the products H$^+$ of water decomposition and the SO$_4^=$ which is transporting into chamber 82 form the H$_2$SO$_4$. The NaOH is removed from chamber 84 by means of an appropriate conduit 24 and is circulated by means of pump 86 into reaction vessel 20. H$_2$SO$_4$ formed within chamber 82 is removed therefrom by means of pump 88 to react with the NaHSO$_3$ in the upper portion of distillation flask 32.

SO$_2$ feed gas which is depleted in heavy isotopes may be suitably removed from reaction column 10 such as through vent pipe or conduit 90 at reaction vessel 20.

The reactions in the electrode chambers of the electrodialysis unit are as follows:

$$\text{Cathode: } 2Na^+ + 2e^- + 2HOH \rightarrow 2Na^+ + 2OH^- + H_2\uparrow \qquad (5)$$

$$\text{Anode: } SO_4^= + HOH \rightarrow H_2SO_4 + 2e^- + 1/2O_2\uparrow \qquad (6)$$

The SO$_2$ feed gas into conduit 16 may be preheated to a suitable temperature such as about 100°C but may preferably be input at ambient temperature. Additions of H$_2$O or other components such as NaOH or H$_2$SO$_4$ to maintain the required concentration, if necessary, may be made directly into conduits 24 and 46 respectively.

The solution within container 68 of the electrodialysis unit 13 is maintained at a temperature of from about 20°C to about 100°C and preferably at about ambient temperature. The solution within container 60 is maintained at a temperature of from about 25°C to about 100°C and preferably at about ambient temperature. Reaction vessels 20 and 26 are maintained at a temperature of from about 20°C to about 100°C and preferably at about 45°C.

The $SO_2$ feed gas which is input into conduit 16 may be fed in at a rate determined by the capacity of the system and desired separation rates and may typically be about 3 pounds per day where separations of about 90% $^{34}S$ are desired. Pumps 54, 65, 86, and 88 may be any appropriate type well known in the art which are not affected by the solutions which they transfer.

Although NaOH having a molarity between about 1 and about 6 has been used in the separation process, other reaction solutions which may be used in the reactor are from about 1 molar to about 6 molar potassium hydroxide (KOH), and from about 1 molar to about 12 molar ammonium hydroxide ($NH_4OH$). The temperature of these solutions may generally vary from about 20 to about 100°C but preferably are maintained at about 45°C.

Since the NaOH or the like preferentially reacts with the heavy sulfur isotope such as $^{34}SO_2$ to form $NaHSO_3$, a greater percentage of $^{34}SO_2$ reacts with the NaOH than $^{32}SO_2$. The depleted feed gas may then be vented through vent pipe 90 as stated hereinabove. Reaction vessel 26 achieves enrichment of $^{34}S$ also by refluxing a portion of the enriched $^{34}SO_2$ gas released from reaction vessel 32 upon decomposition of the $NaHSO_3$ through this second reaction vessel 26.

The quantities or concentrations of materials used, volume wise, is dependent upon the size of the vessel which is to be used. In a typical operation however, the $SO_2$ feed gas may be initially enriched about 20 to about 90% $^{34}S$ from a 5 unit or other conventional enrichment process if such is required or desired. With a feed gas having about 4.2% enrichment of $^{34}SO_2$, reaction columns 30 feet long may be used to enrich $SO_2$ to about 90% $^{34}SO_2$. With columns of about 4 inch to about 1 inch in diameter, approximately 4.0 grams of 90% $^{34}S$ enriched $SO_2$ may be produced per day. $SO_2$ in these experiments may be passed up through vessel 20 at a flow rate of about 3 pounds per day. The $NaHSO_3$ thus formed may be decomposed from distillation flask 32 at a temperature of from about 20°C to about 140°C.

Table I illustrates results that may be obtained in this enrichment process.

with an electrodialysis unit may be used where applicable to effect closed loop reflux circuits, and is not intended to be limited to sulfur isotopic separation process. For example, $SO_2$ may be enriched in $^{36}S$ as shown by Table II.

TABLE II

| Sulfur-36 Conc. % | $^{36}S$ Production Cases Total Prod. Rate, grams/day | Sulfur-34 Conc. % |
|---|---|---|
| 20 | 0.13 | 80 |
| 30 | 0.088 | 70 |
| 40 | 0.066 | 60 |
| 50 | 0.053 | 50 |

Sulfur isotope production of the above-described reaction column has been determined using a separation factor of 1.007, flow rate of 2.9 liters/day, and bisulfite concentrations of 3 M. Values of height equivalent of a theoretical plate (HETP) used for the determination of the values given in Table I and Table II in the bisulfite process or hydrogen sulfite process ranged from 2.5 to 9 centimeters.

The capacity of the above-described reaction vessel for production of 90% sulfur-34 has been determined, using the above values, to be about 4 grams per 24 hours. It should be noted that sulfur-33 ($^{33}S$) may also be produced at an enrichment of about 6%. $^{33}S$ may be of considerable interest in various research studies involving nuclear magnetic resonance. Fractional gram production of sulfur-36 ($^{36}S$) may also be possible as illustrated in Table II although equilibrium times may be longer. $^{33}S$ and $^{36}S$ may also be removed through exit conduit 48.

The initial $^{33}S$, $^{34}S$ and $^{36}S$ concentrations in the $SO_2$ feed gas were 0.7%, 4.2% and 0.014% respectively in the examples given in Table I and Table II. The raffinate rate referred to in Table I is removed from conduit 90 in the drawing. The raffinate contains in all cases greater than 98% concentration of $^{32}S$.

As shown in Table II, $^{36}S$ production may be effected using the apparatus of this invention. $SO_2$ containing about 0.014% $^{36}S$ may be fed into the solution and $^{36}S$ separated from $^{32}S$. This is effected in the same manner as a separation of $^{34}S$ from $^{32}S$ is effected. The $^{36}S$ has an affinity to react with the NaOH and thus form $NaHSO_3$ which is thereafter reacted with $H_2SO_4$ as described hereinabove to release $^{36}S$ enriched $SO_2$ gas which may be removed through conduit 48.

The closed loop reflux system achieved by this reaction column and electrodialysis unit combination requires no continuous external supply of chemicals other than the initial charge and does not produce any

TABLE I

| Sulfur-34, Conc. % | Sulfur-33 Conc. % | $^{34}S$ Production Cases All Raffinate >98% $^{32}S$ Prod. Rate gram/day | Sulfur-36 Conc. % | Raffinate Rate Sulfur-32, g/day |
|---|---|---|---|---|
| 20 | 2.2 | 22.9 | 0.08 | 135 |
| 30 | 2.9 | 13.9 | 0.13 | 126 |
| 40 | 3.6 | 10.0 | 0.17 | 111 |
| 50 | 4.3 | 7.8 | 0.21 | 111 |
| 60 | 4.9 | 6.4 | 0.26 | 111 |
| 70 | 5.4 | 5.4 | 0.30 | 110 |
| 80 | 5.8 | 4.7 | 0.34 | 110 |
| 90 | 6.0 | 4.1 | 0.39 | 110 |

Although the system described herein has been primarily described for sulfur isotope separation, the novel combination of a chemical exchange reaction column waste chemical solutions or products which have to be disposed of. This is accomplished in chemical reflux by converting the waste stream to the reflux stream chemicals. The closed loop reflux system is paramount to the chemical exchange process and produces a bisulfate exchange system as described and applied herein which is economically attractive and ecologically desirable.

What is claimed is:

1. A method for separating different isotopes of sulfur contained in a sulfur dioxide feed gas wherein the chemicals used for the separation processes are reacted, regenerated and reused with said feed fluid comprising; contacting and reacting said feed gas with a material selected from the group consisting of sodium hydroxide at a molarity between about 1 and about 6 molar, potassium hydroxide at a molarity between about 1 and about 6 molar, and ammonium hydroxide at a molarity between about 1 and about 12 molar, at a temperature of from about 20°C. to 100°C. to form a hydrogen sulfite ($HSO_3^-$) reaction product, continuing said contacting of said feed gas and said material to effect exchange of the heavier isotopes of sulfur in said sulfur dioxide feed gas with lighter isotopes of sulfur in said hydrogen sulfite reaction product, said contacting and isotope exchange yielding said hydrogen sulfite reaction product enriched in the heavier isotopes of sulfur, removing reacted feed gas depleted in said heavier isotopes, contacting at a temperature of from 25°C. to 70°C. said hydrogen sulfite ($HSO_3^-$) reaction product enriched in said heavier isotopes of sulfur with sulfuric acid at a molarity between about 1 molar and about 6 molar to form a subsequent sulfur dioxide gas enriched with the heavier of said isotopes of sulfur and hydrogen sulfate ($HSO_4^-$) reaction product, removing said subsequent sulfur dioxide gas enriched with a heavier of said isotopes, contacting said hydrogen sulfate ($HSO_4^-$) reaction product with said material at a temperature of from 25°C. to 100°C. to form a separate sulfate reaction product, passing an electrical current through said separate sulfate reaction product at a temperature of from 20°C. to 100°C. to dissociate said separate sulfate reaction product into anions and cations, effecting migration of said cations through a cation permeable membrane to form said material, and effecting migration of said anions through an anion permeable membrane to form said sulfuric acid, and recycling said material and said sulfuric acid to contact and react with additional quantities of said sulfur dioxide feed fluid.

2. The method of claim 1 including the step of separating and enriching sulfur-36 isotope from sulfur-34 isotope.

3. The method of claim 1 including the step of separating and enriching sulfur-34 isotope from sulfur-32 isotope.

4. The method of claim 1 wherein said contacting of said hydrogen sulfite reaction product and said sulfuric acid is at about 20°C. and about 70°C.

5. The method of claim 4 including the step of additionally refluxing said heavy isotope enriched hydrogen sulfite ($HSO_3^-$) reaction product with said subsequent sulfur dioxide gas to further increase heavy isotope enrichment.

* * * * *